FREQUENCY MULTIPLIER
Filed Oct. 3, 1962
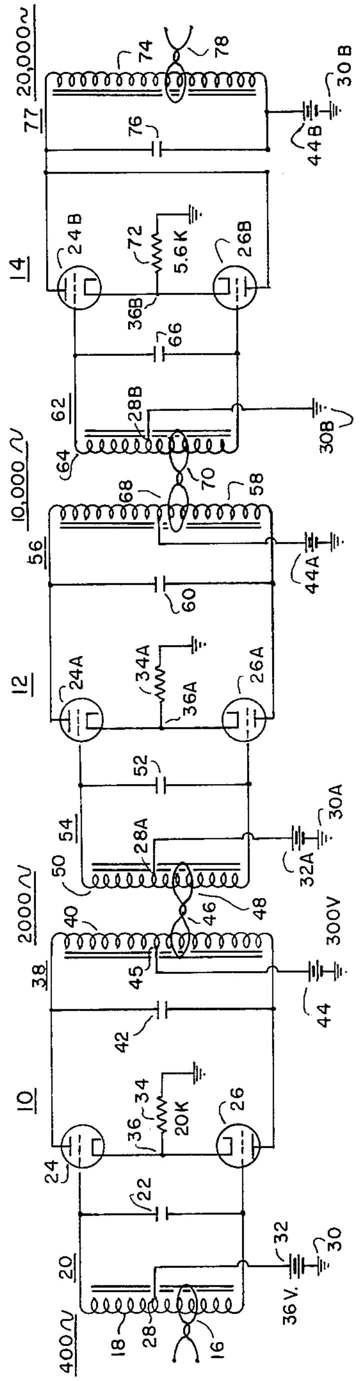
ARMAND P. LUCCHESI,
JEFFERSON B. TURNER,
*INVENTORS*
BY [signature]
Charles A. Phillips
ATTORNEYS

United States Patent Office 3,202,918
Patented Aug. 24, 1965

3,202,918

FREQUENCY MULTIPLIER

Armand P. Lucchesi, 74 Booraem Ave., Jersey City, N.J., and Jefferson B. Turner, 3328 Wildwood Drive, Huntsville, Ala.

Filed Oct. 3, 1962, Ser. No. 228,205
1 Claim. (Cl. 328—15)
(Granted under Title 35, U.S. Code (1952), sec. 266)

The invention described herein may be manufactured and used by or for the Government of the United States of America for governmental purposes without the payment of any royalties thereon or therefor.

This invention relates to frequency multipliers and particularly to electronic type frequency multipliers.

Frequency multipliers of the electronic type, such as employ vacuum tube amplifiers as opposed to passive types such as rely on inductors, are widely employed to perform frequency multiplictaion from the low kilocycle range to the kilomegacycle range. Typically an electronic frequency multiplier consists of a class "C" amplifier with an output tuned to the desired multiple of the tuning of its input circuit. Class "A" and class "B" operation of frequency multipliers is believed to have been largely ignored due to inefficiency and ineffectiveness of conventional approaches, particularly where multiplication greater than two or three is desired from a single stage. Multiplication in single electronic stages by a factor greater than three or four has in general left much to be desired regardless of the class of operation employed. Multiplication by five in a single stage and at the same time to obtain some reasonable amplification has proven both difficult and generally unreliable. If one adds to these requirements the feature of good regulation of output amplitude over a relatively broad bandwidth, previous techniques have fallen quite short.

The object of this invention is to overcome the aforesaid difficulties and to provide a solution to the problem faced in providing a reliable, broadband frequency multiplier capable of substantial multiplication in a single stage. A further object is to provide an improved broadband multi-stage type of multiplier capable of accurate multiplication by factors of from 50 to several thousand or even greater.

In accordance with our invention class "A" operation (or substantially class "A" operation) of a vacuum tube multipiler is combined with tuned input and output circuits having a very high Q, in excess of 50 and preferably in the range between 100 and 300. Contrary to the most logical conclusion, it has been found that the affect of high circuit Q, as employed in this combination, is an increased bandwidth. Further it has been discovered that maximum gain is obtained, not with high amplification pentodes, but with high mu triodes such as with a type 12AX7. A still further improvement in operation was found to be possible by providing a balanced input amplifier, with or without a balanced output, depending upon whether an even or odd multiple output is desired. Still further optimization, particularly where multistage operation is contemplated, was determined possible by providing a substantial negative feedback by an unbypassed cathode resistor and, where necessary to achieve sufficient feedback and still maintain normal grid biasing, a fixed positive bias is added to the negative bias provided by the cathode resistor. Amplitude regulations is enhanced, particularly in multi-stage multipliers, by providing a drive voltage which is sufficient to produce limiting. From tests it has been found that over-drive, by several times limiting voltage, do not appear to sufficiently distort circuit output as to produce multiplication errors.

Other objects, features and advantages of our invention will be apparent from the following detailed description when read in conjunction with the accompanying drawing which is a schematic circuit diagram of an embodiment of the invention.

Referring now to the drawing there is shown a three stage cascade multiplier in which the first two stages, 10 and 12, are basically alike and have balanced inputs and outputs, and the third stage 14 has a balanced input and an unbalanced output. An input signal, e.g. 400 cycles, is applied to stage 10 by link coupling the signal by means of a one turn coil 16, inductively coupled to input inductor 18 of parallel tuned input circuit 20, comprising inductor 18 and capacitor 22. The output of parallel input circuit 20 is conventionally applied grid-to-grid to the grid inputs of high mu (e.g. 100) triode vacuum tubes 24 and 26 (e.g. 12AX7). A center tap 28 of inductor 18 is connected to common ground terminal 30 through bias source 32 which provides a positive bias of approximately 36 volts at each grid with respect to ground. Cathode resistor 34 is of a fairly large value (e.g. 20,000 ohms) and connects between ground and a common cathode connection 36 interconnecting the cathodes of tubes 24 and 26. A balanced tuned output circuit 38 consisting of inductor 40 and capacitor 42 is connected in parallel between the anodes of tubes 24 and 26. An anode voltage source 44, having a low A.C. impedance, is connected between ground and center tap 45 on inductor 40 and is poled to provide a positive bias of approximately 300 volts on the anodes of tubes 24 and 26.

Tuned input circuit 20 is tuned to the 400 cycle input and tuned output circuit 38 is tuned to 2,000 cycles to achieve multiplication in stage 10 by a factor of five. Inductors 18 (e.g. 800 microhenries) and 40 (e.g. 400 microhenries) each have a Q sufficiently above 150 to achieve a tuned circuit Q of approximately 150. With the indicated bias voltages applied and without signal input, the cathode voltage across resistor 34 is approximately 43 volts thus the net, (cathode minus fixed bias) no-signal grid-to-cathode voltage is —7 volts, for class "A" operation. The input signal is adjusted to a point just above the point where limiting in stage 10 occurs. At this point the amplification or gain in stage 10 is approximately ten, and, as indicated above, the output frequency is 2,000 cycles.

The output of stage 10, which is enough to produce limiting in stage 12, is coupled by means of one turn coils 46 and 48 from output inductor 40 of stage 10 to input inductor 50 of stage 12. Those components of stage 12 which are identical to those of stage 10 bear the same reference numeral as those in stage 10 with the suffix A added and similarly in stage 14, a B is added. Inductor 50 and capacitor 52, which form a balanced input circuit 54, are connected and function in the same manner as input circuit 20 of stage 10 except that tuned circuit 54 is tuned to 2,000 cycles. Similarly, tuned output circuit 56 of stage 12, consisting of inductor 58 and capacitor 60 in parallel, is similar to tuned output circuit 38 of stage 10 except that it is tuned to 10,000 cycles, to achieve a second stage 12 multiplication by 5.

Multiplier stage 14, which is fed a signal which produces limiting, provides multiplication by 2, for example, and differs primarily from stages 10 and 12 in that it has a balanced input and unbalanced, single ended, output to accommodate an even harmonic output. The balanced input circuit 62 consists of inductor 64 connected in parallel with capacitor 66 and is tuned to 10,000 cycles, the frequency of the output signal coupled via inter-connecting coils 68 and 70 between inductor 58 of stage 12 and inductor 64 of stage 14. Inasmuch as the multiplication required of stage 14 is only two, it is unnecessary to provide the degree of cathode feedback provided in stages 10 and 12 and thus cathode resistor 72 is reduced, for example, to 5,600 ohms. With reduced cathodes bias it is also unnecessary to apply a fixed positive bias to the grids of tubes 24B and 26B to raise the operating point, as in the case of stages 10 and 12 wherein it is employed to provide sufficient output. Inductor 74 and capacitor 76, which form a high Q parallel tuned output circuit 77 tuned to 20,000 cycles, are connected between D.C. source 44B and the anodes of tubes 24B and 26B. The output frequency of the multiplier, 20,000 cycles, appears across inductor 74 and is available at the terminals of output coil 78 which is link-coupled to inductor 74.

From the foregoing it is seen that a 400 cycle input applied to stage 10 is multiplied 50 times in three stages. From tests it has been found that the output product maintains accuracy with the input frequency shifted ±7 cycles. Employing high Q circuits throughout together with class "A" operation and negative feedback, stable and constant output is obtained. While only three stages of multiplication are illustrated, and in a circuit which provides a multiplication of 500, additional stages may be added to achieve multiplication many times this amount.

Obviously, modifications and variations of the present invention are possible in accordance with the above teaching. It is, therefore, to be understood that within the scope of the appended claim, the invention may be practiced other than as specifically described.

What is claimed is:

A broad-band cascaded frequency multiplier system comprising:

(a) at least a first and second multiplier stage each of said stages including,
  (1) a first and second high mu vacuum tube electrically connected together to form a push-pull amplifier, each of said tubes having an anode, cathode and control grid;
  (2) an unbypassed cathode resistor connected in series from a common cathode connection of said push-pull amplifier to a common potential point;
  (3) a balanced tuned input circuit having a center tapped inductor with a circuit Q greater than fifty connected to said grids of said push-pull amplifier for increasing the bandwidth of said broad-band frequency multiplier system;
  (4) a direct current source of bias potential connected between said center tap of said high Q inductor and said common potential point so that said center tap is biased positive with respect to said common potential point;
  (5) a balanced tuned output circuit having a circuit Q greater than fifty connected to said anodes of said amplifier for increasing the bandwidth of said broad-band frequency multiplier system, said balanced tuned output circuit of each of said multiplier stages being tuned to an odd multiple of the frequency to which said balanced tuned input circuit of each of said multiple stage is tuned;
  (6) an anode voltage source connected between said common potential point and said anodes of said push-pull amplifier through said tuned output circuits so as to supply a positive potential to said anodes;
  (7) the operating parameters of each of said multiplier stages of said broad-band frequency multiplier system being selected so that each stage of said multiplier system operates to provide a signal at a level sufficiently high to produce limiting in a succeeding stage of said multiplier system when each said multiplier stage providing said signal is driven to a point of limiting;
(b) link-coupling means connected between said balanced tuned output circuit of said first multiplier stage and said balanced tuned input circuit of said second multiplier stage for coupling the output signal from said first multiplier stage to said second multiplier stage;
(c) signal producing means link-coupled through said balanced tuned input circuit to said first multiplier stage of said cascaded frequency multiplier system, said signal producing means acting to supply an input signal of sufficient amplitude to said first multiplier stage to produce limiting at the output circuit thereof; and
(d) output means connected to said balanced tuned output circuit of said second multiplier stage from which an output signal of said broad-band frequency multiplier system can be taken.

References Cited by the Examiner

UNITED STATES PATENTS

| | | | |
|---|---|---|---|
| 2,218,524 | 10/40 | Chaffee | 331—53 |
| 2,221,398 | 11/40 | Geohegan | 330—119 |
| 2,262,380 | 11/41 | Bach | 328—20 |
| 2,334,189 | 11/43 | Goldstine | 328—16 |
| 2,516,181 | 7/50 | Bruene | 330—121 |
| 2,714,137 | 7/55 | Dzwons | 330—121 |

OTHER REFERENCES

Air Training Command Manual 101-2, October 1955, Double Tuned–Stagger Tuning, pages 220–222.

Electronics, April 1942, Wide Band Amplifiers & Frequency Multiplication, by D. L. Jaffee, pages 56–61.

ARTHUR GAUSS, *Primary Examiner.*